United States Patent [19]
Massey

[11] Patent Number: 5,633,792
[45] Date of Patent: May 27, 1997

[54] PULSE WIDTH ROTARY INVERTER

[76] Inventor: John C. U. Massey, 22262 Davenrich St., Toro Park/Salinas, Calif. 93908

[21] Appl. No.: 432,060

[22] Filed: May 1, 1995

[51] Int. Cl.$^6$ .............................. H02M 7/60; H02K 9/00
[52] U.S. Cl. ........................ 363/109; 310/59; 310/129
[58] Field of Search ...................... 363/8, 41, 159, 363/102, 109, 174; 310/24, 25, 29, 32, 59, 10.1, 186, 129, 160; 322/46, 14, 32; 200/564; 318/720, 721; 171/123; 290/31

[56] References Cited

U.S. PATENT DOCUMENTS

| | | | |
|---|---|---|---|
| 768,738 | 8/1904 | Dunn | 204/238 |
| 1,286,034 | 11/1918 | Leich | 172/281 |
| 1,337,071 | 4/1920 | Hobart | 171/123 |
| 2,009,788 | 7/1935 | Sabbah et al. | 175/363 |
| 3,480,850 | 11/1969 | Gabor et al. | 321/7 |
| 4,024,455 | 5/1977 | Yarrow et al. | 363/102 |
| 4,027,226 | 5/1977 | Studtman | 321/47 |
| 4,035,712 | 7/1977 | Yarrow et al. | 322/24 |
| 4,476,540 | 10/1984 | Corral | 364/851 |
| 4,878,163 | 10/1989 | Yamato et al. | 363/8 |
| 5,341,055 | 8/1994 | Roche | 310/24 |
| 5,493,200 | 2/1996 | Rozman et al. | 322/10 |

*Primary Examiner*—Peter S. Wong
*Assistant Examiner*—Adolf Berhane

[57] ABSTRACT

A rotary type inverter capable of generating a variable pulse train electro-mechanically for converting D.C. to A.C. with a Sine wave shape, and consists primarily of a D.C. electric motor driving a "variable pulse width" generating drum. Mounted over this drum are electrical current collecting sliding brushes. These are first: To bring in input D.C. source voltage to an electrically conductive slip ring imbedded 360 degrees into a solid drum made of electrically insulating material; Second: To collect the A.C. voltage output generated by electrically conductive segments of variable widths, also imbedded upon and around this electrically insulating drum material.

5 Claims, 10 Drawing Sheets

TYPE I "PWRI"
ISOMETRIC VIEW

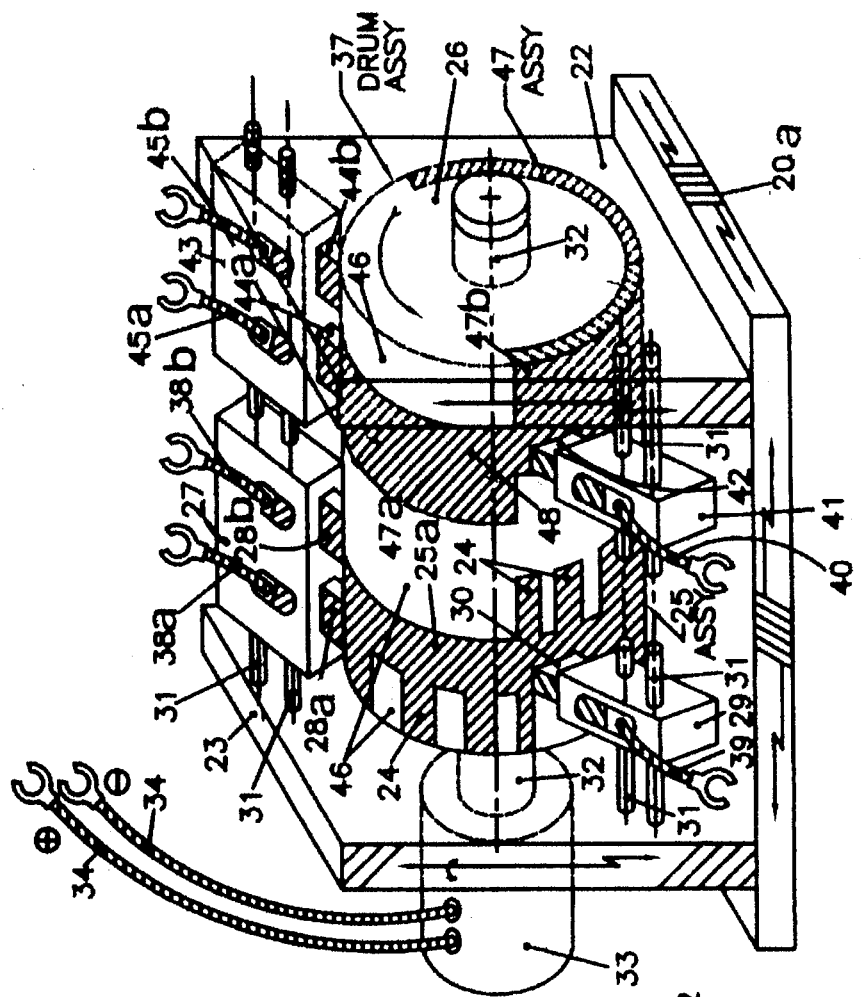
FIG 1B TYPE II "PWRI" ISOMETRIC VIEW
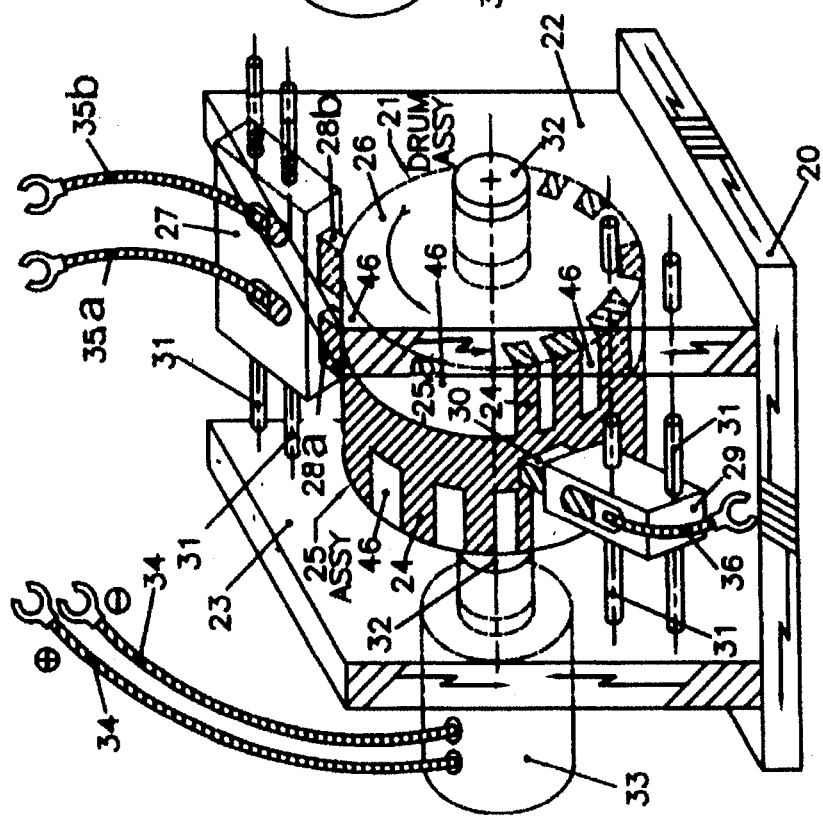
FIG 1A TYPE I "PWRI" ISOMETRIC VIEW

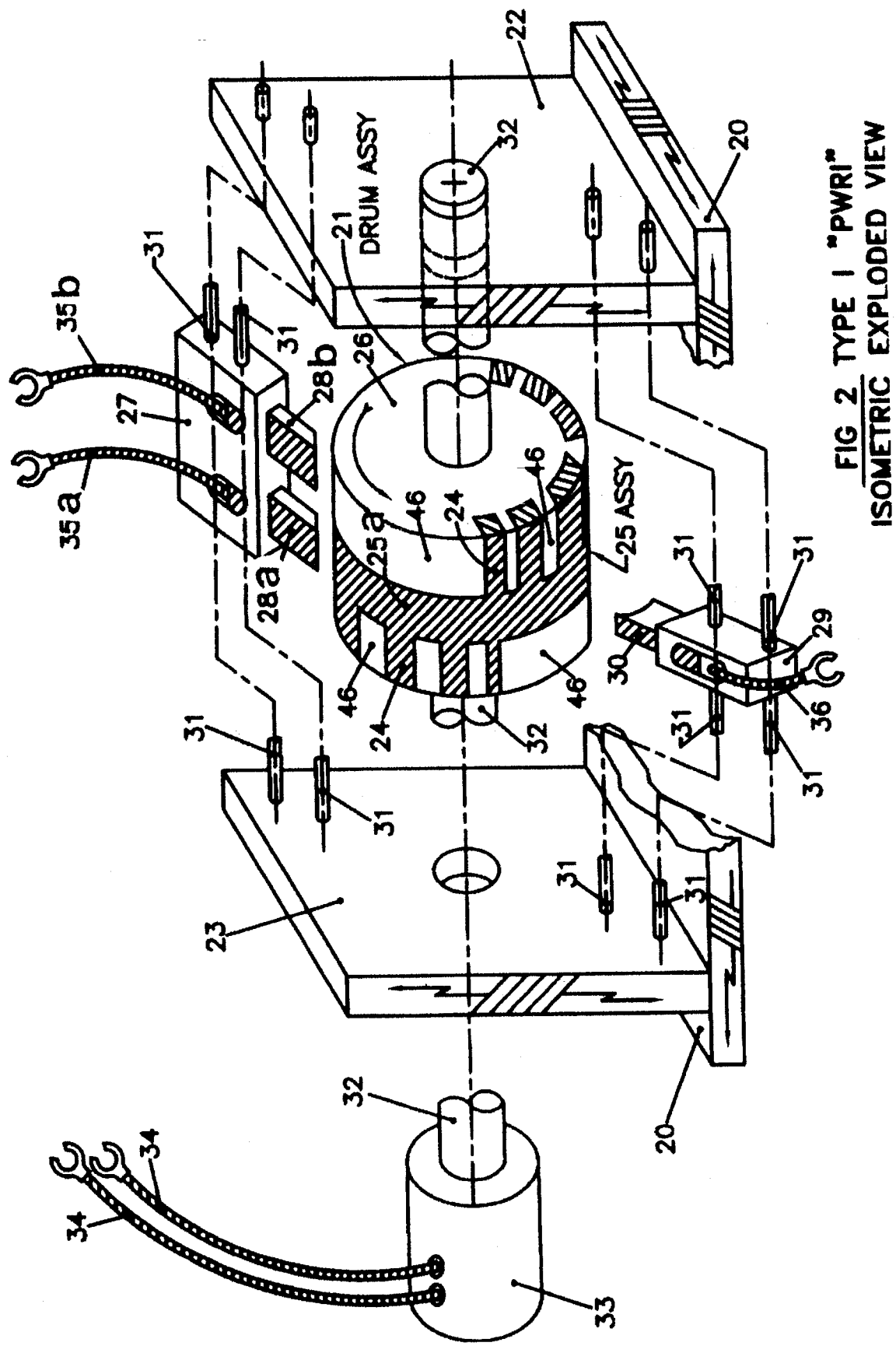
FIG 2 TYPE I "PWRI"
ISOMETRIC EXPLODED VIEW

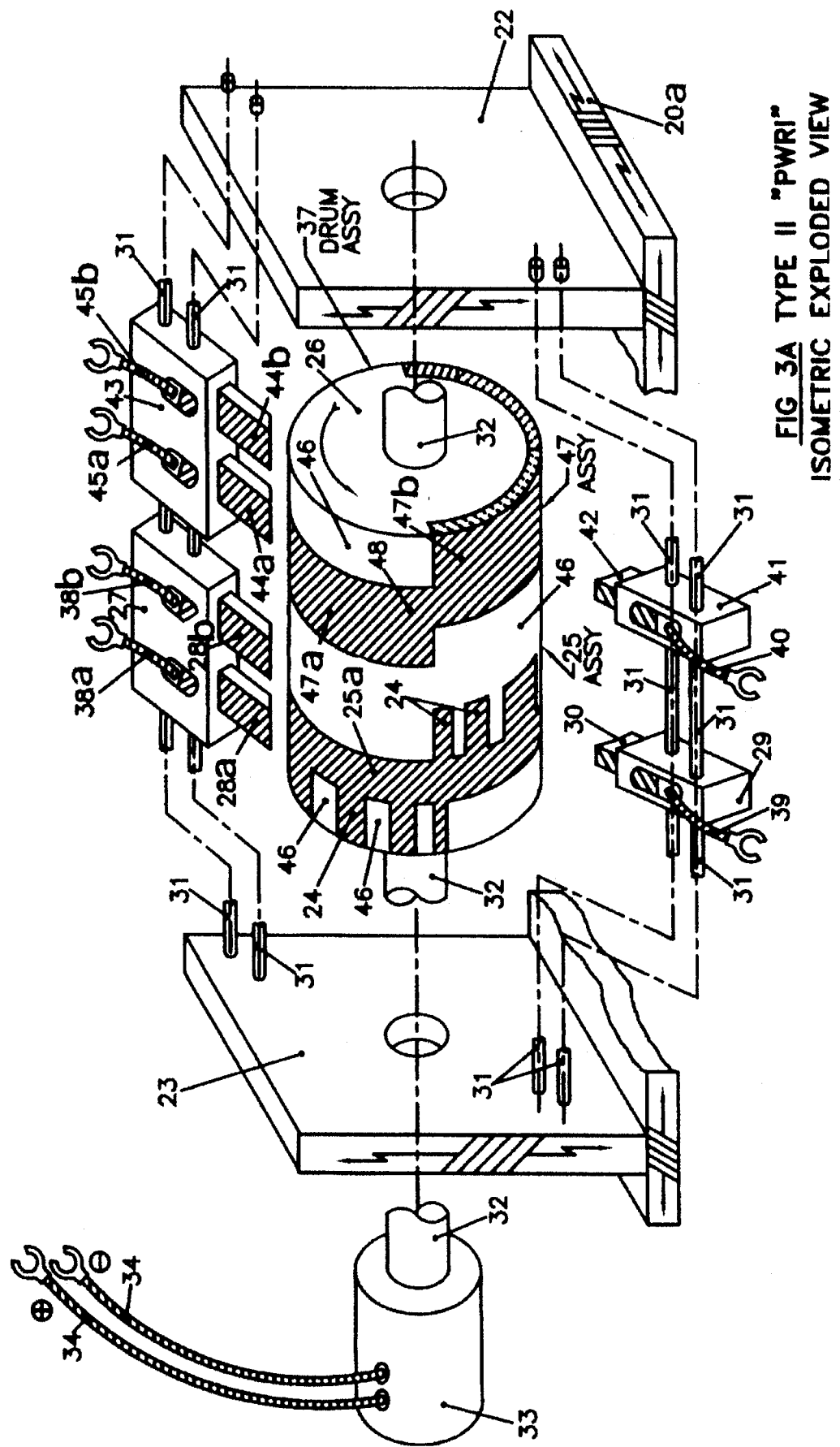
FIG 3A TYPE II "PWRI" ISOMETRIC EXPLODED VIEW

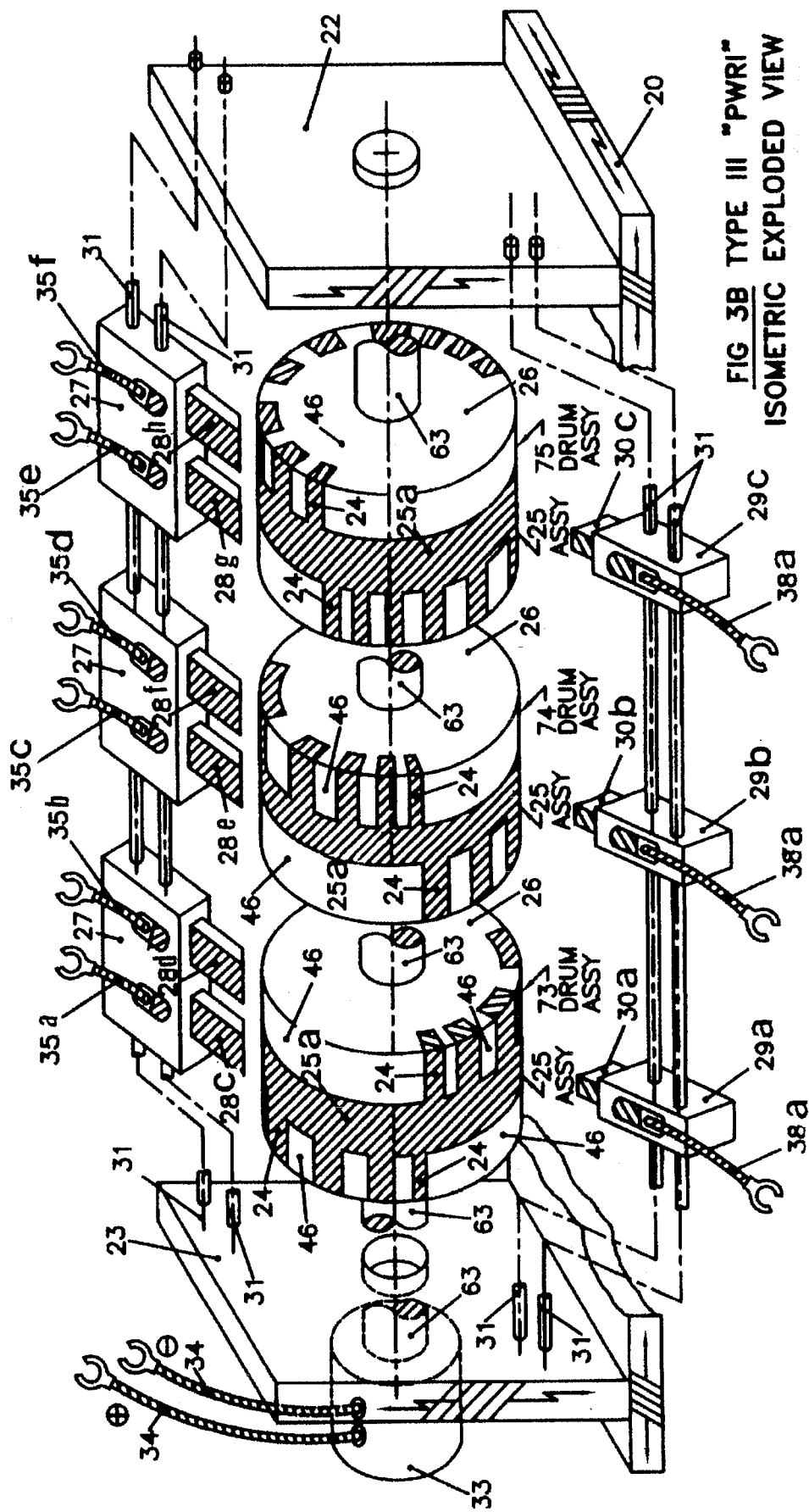
FIG 3B TYPE III "PWRI" ISOMETRIC EXPLODED VIEW

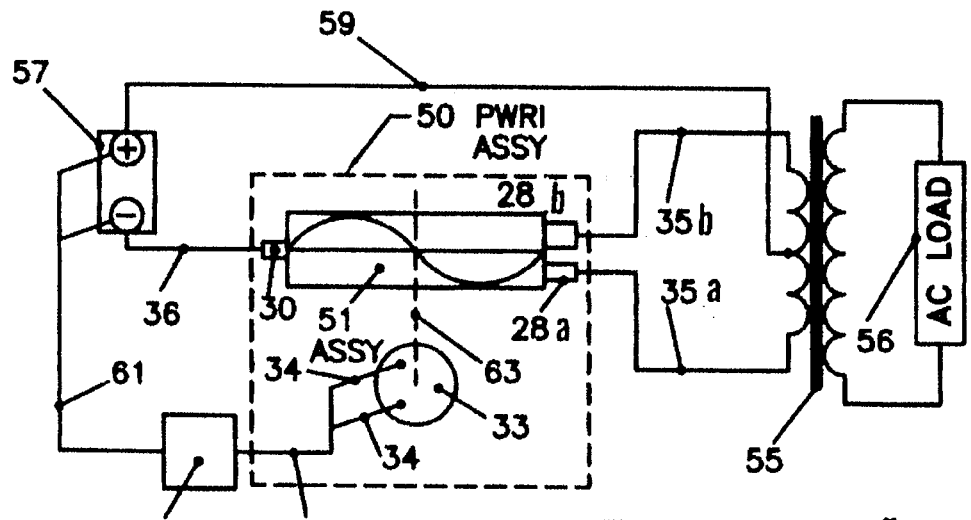
FIG 4B TYPE I "PWRI" SCHEMATIC
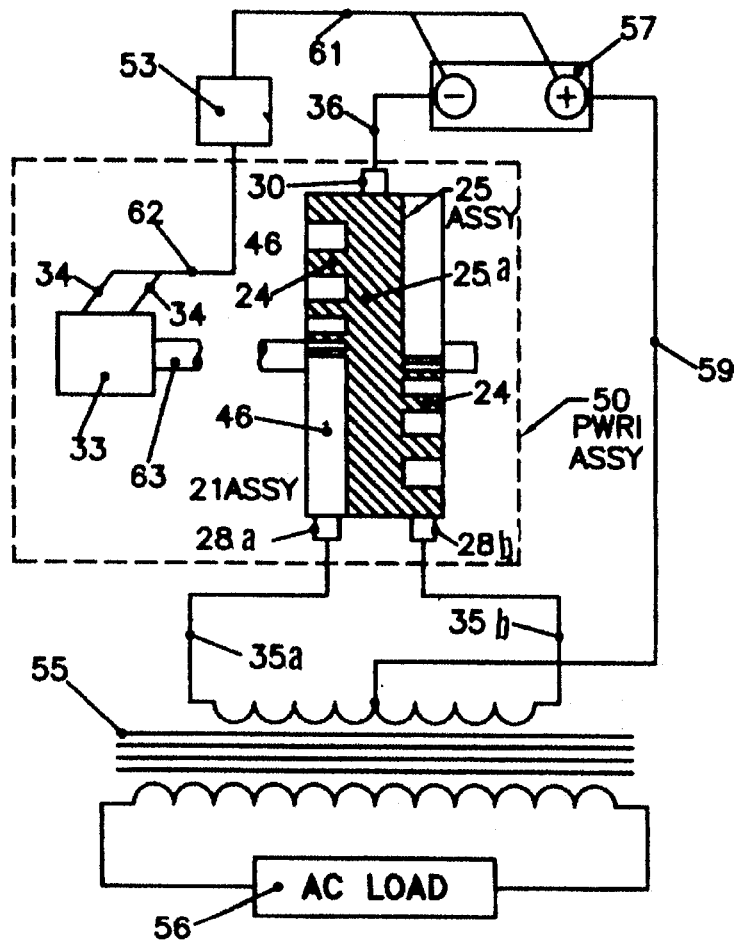
FIG 4A TYPE I "PWRI" WIRING DIAGRAM

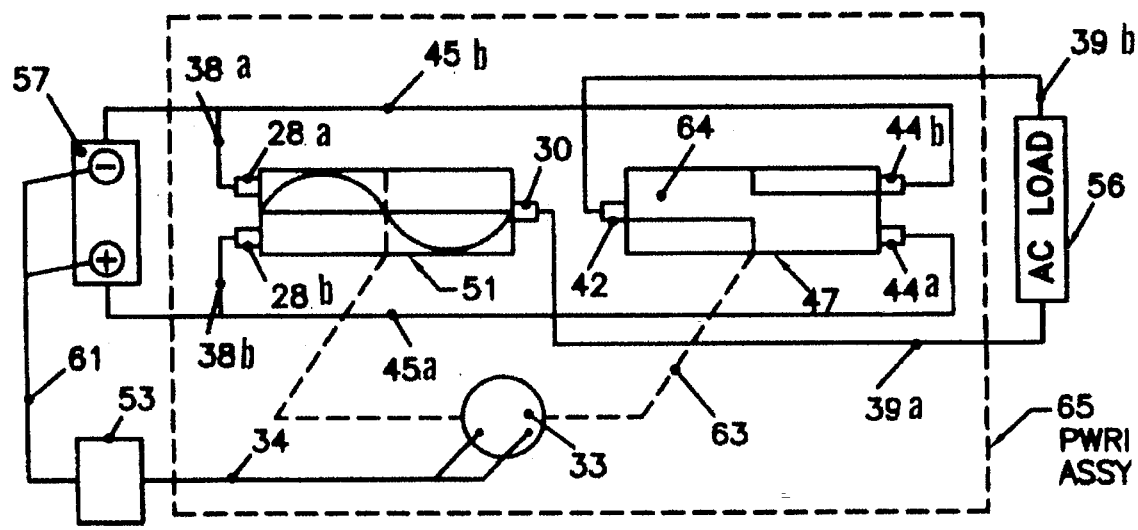
FIG 5B TYPE II "PWRI" SCHEMATIC
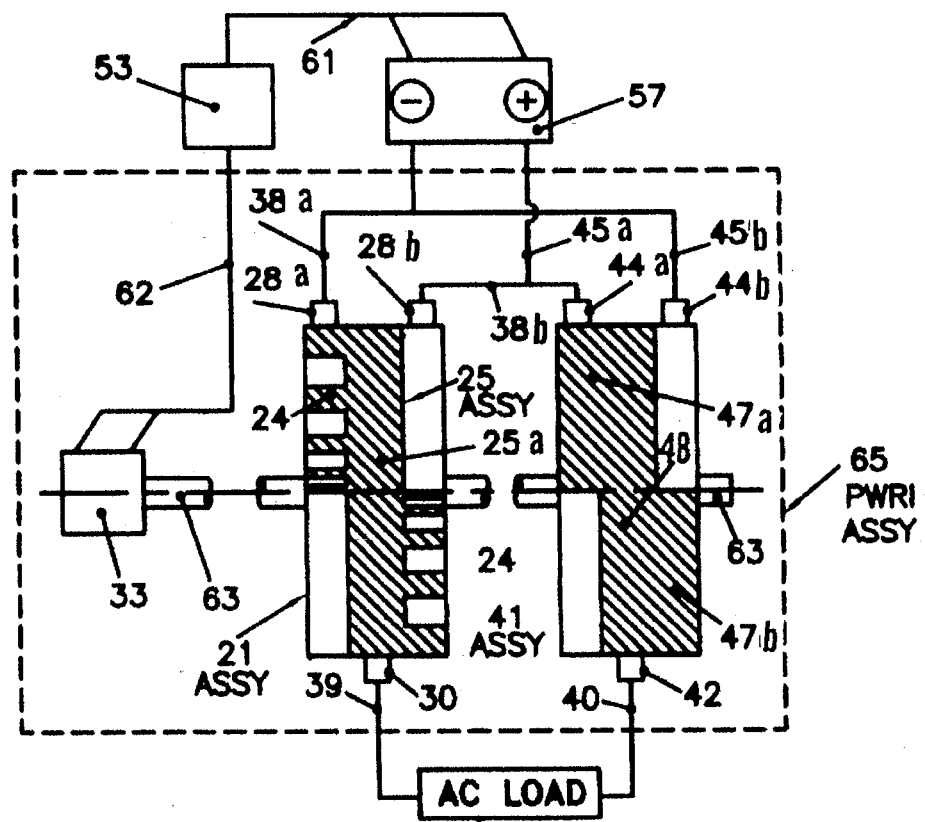
FIG 5A TYPE II "PWRI" WIRING DIAGRAM

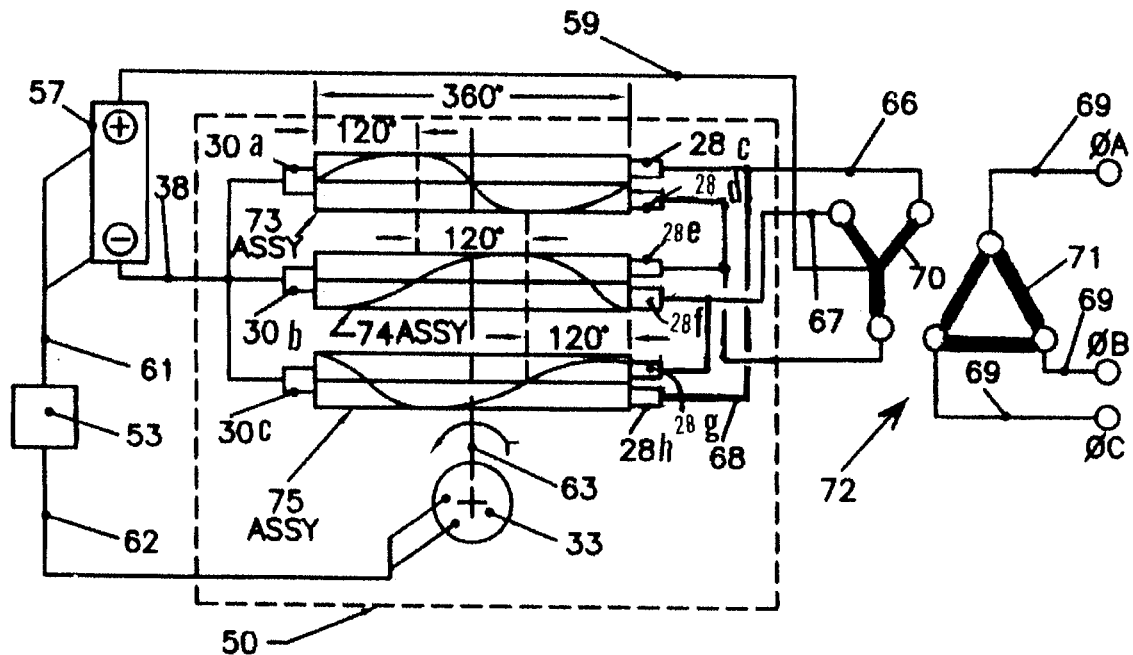
FIG 6B TYPE III "PWRI"
SCHEMATIC FOR 3 PHASE AC
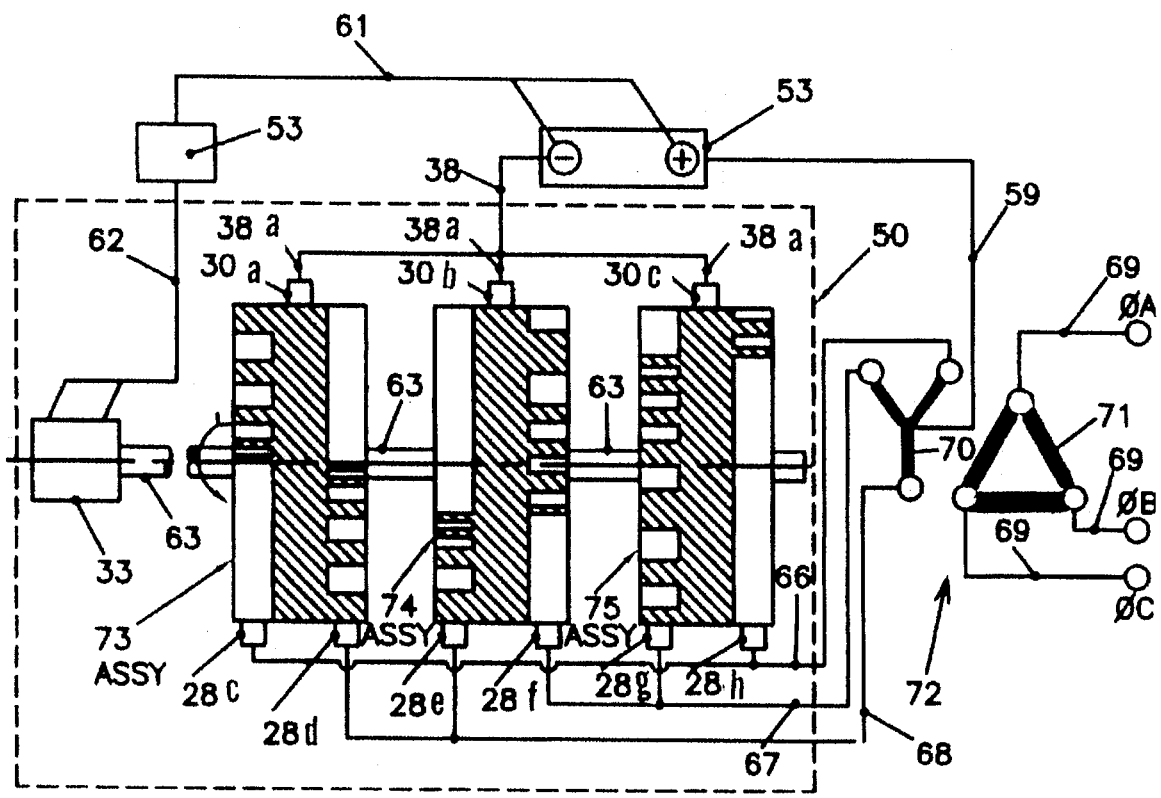
FIG 6A TYPE III "PWRI"
WIRING DIAGRAM FOR 3 PHASE AC

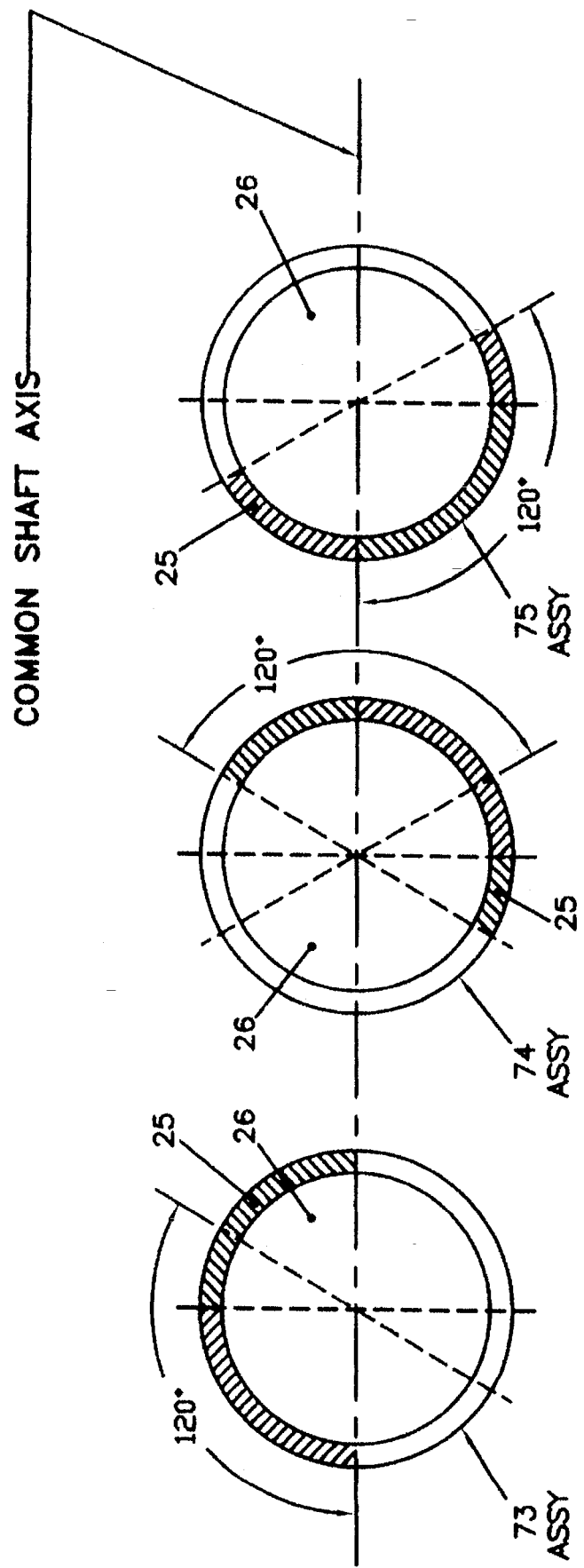

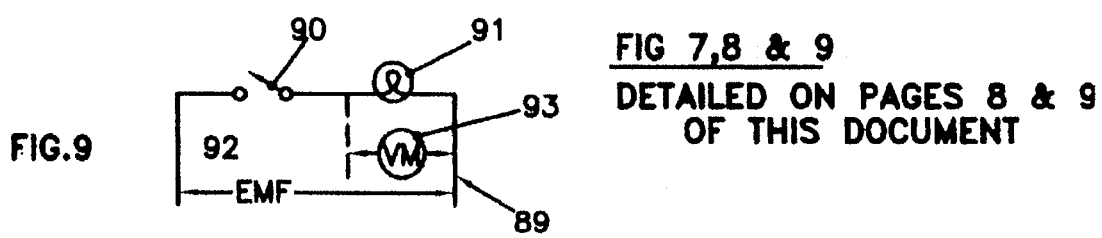
FIG 7,8 & 9
DETAILED ON PAGES 8 & 9
OF THIS DOCUMENT
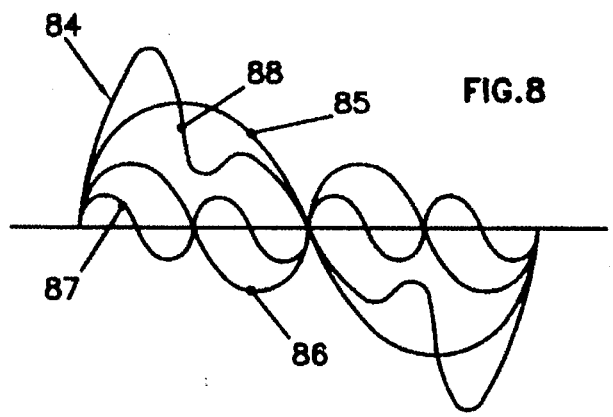
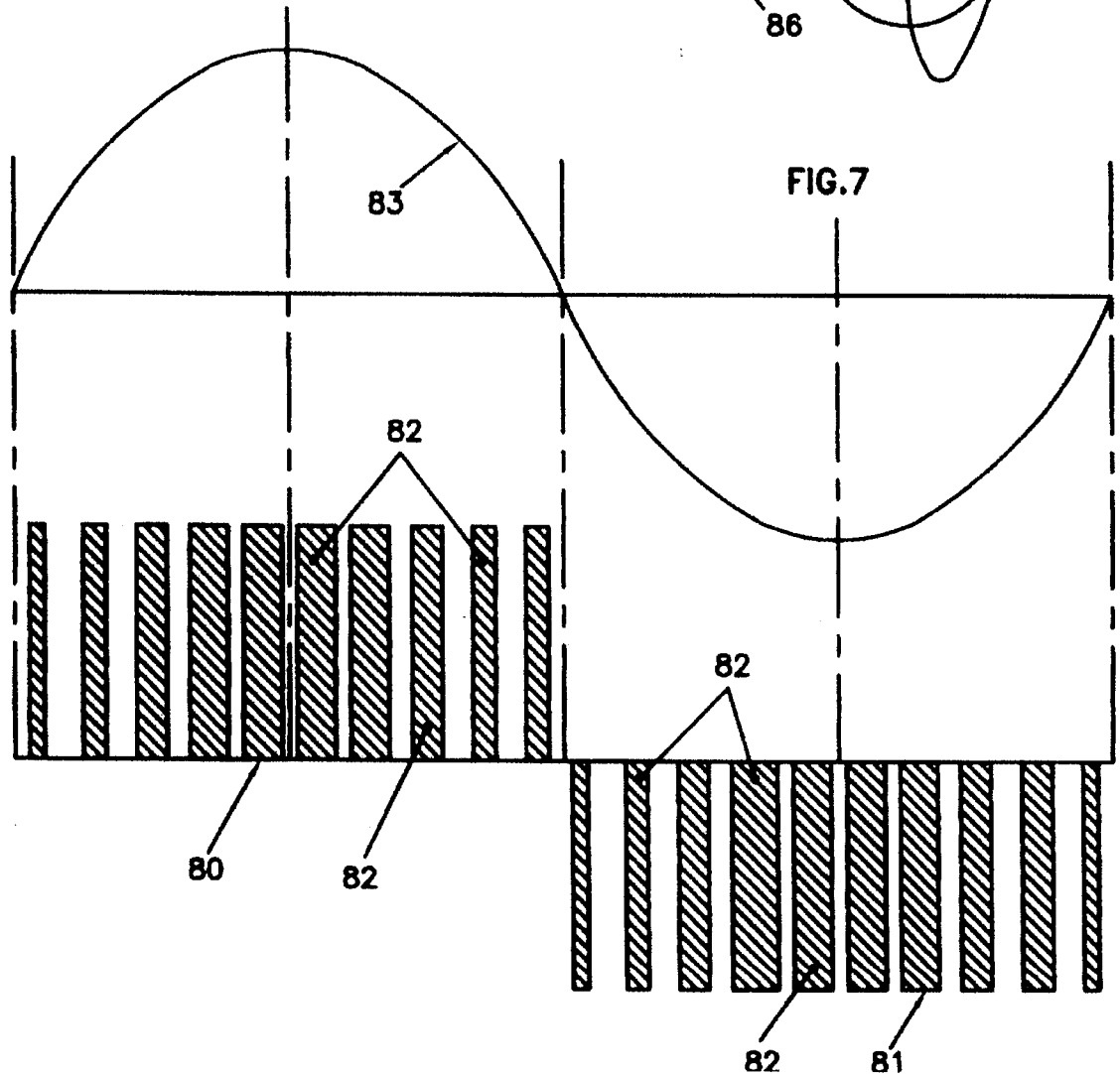

FIGURES 10A TO 10E
DWGS OF "PRIOR ART" INVERTER SYSTEMS
DETAILED ON PAGES 9 & 10
OF THIS DOCUMENT
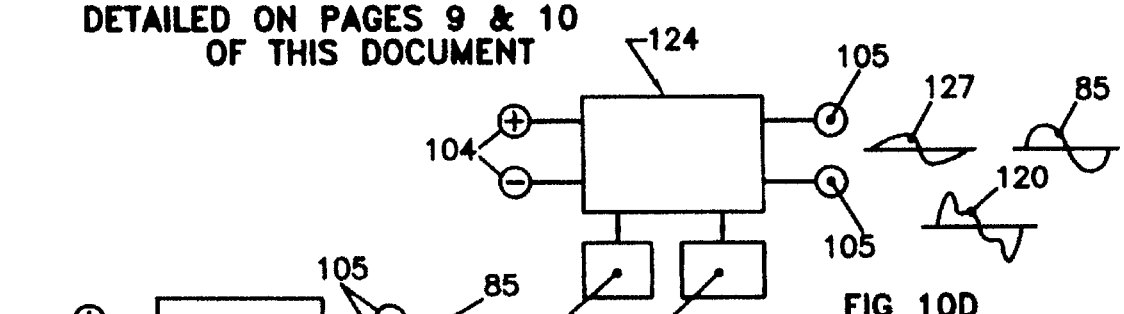
FIG 10D "PRIOR ART"
FIG 10F "PRIOR ART"
FIG 10B "PRIOR ART"
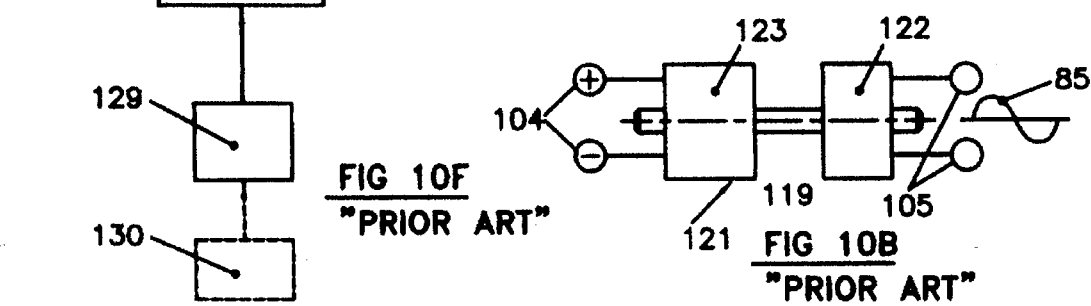
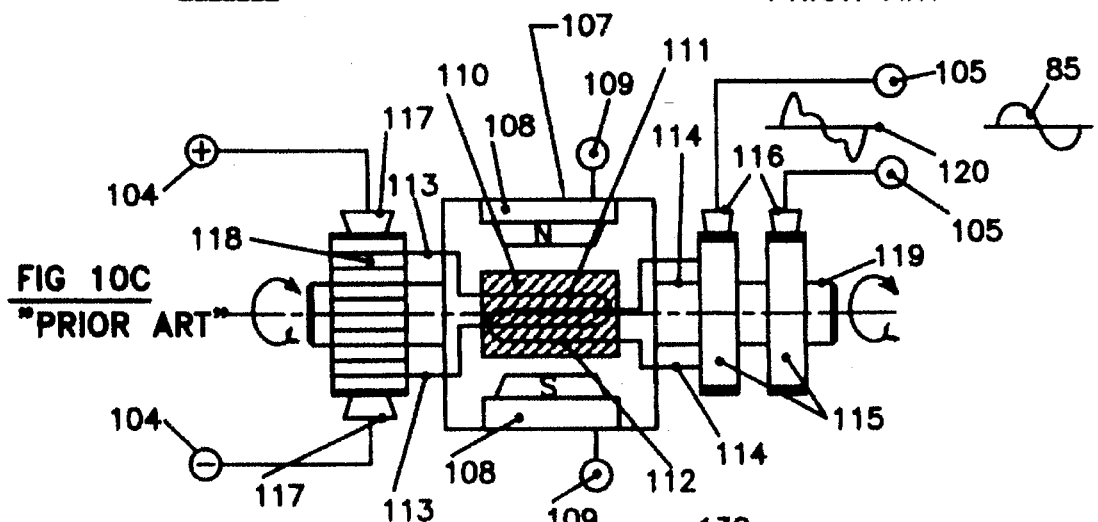
FIG 10C "PRIOR ART"
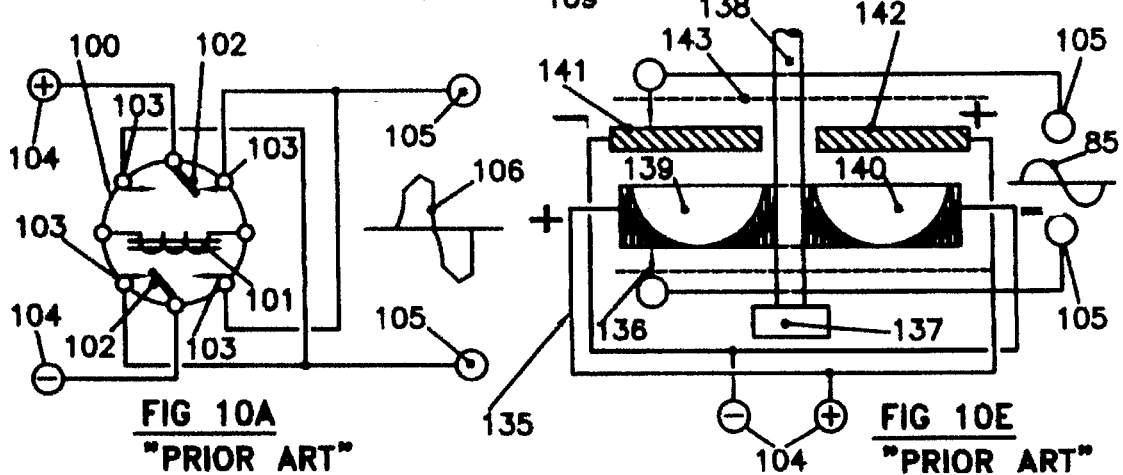
FIG 10A "PRIOR ART"
FIG 10E "PRIOR ART"

PULSE WIDTH ROTARY INVERTER

CONTENTS

I. Background—Field of Invention
II. Background—Description of Prior Art
III. Objective & Advantages
IV. Description of Drawings and Schematics
V. Reference Numerals in Drawings
VI. Description of Invention
VII. Operation & Functioning
VIII. Summary, Ramification, Scope & Conclusion
IX. Claims
X. Abstract
XI. Abbreviations & Units (No abbreviation in Claims)
XII. Prototype Photographs
XIII. Drawings

| Sheet | Figure | |
|---|---|---|
| 1 of 10 | FIG. 1A | Type I "PWRI" Isometric |
| | FIG. 1B | Type II "PWRI" Isometric |
| 2 of 10 | FIG. 2 | Type I "PWRI" Isometric Exploded View |
| 3 of 10 | FIG. 3A | Type II "PWRI" Isometric Exploded View |
| 4 of 10 | FIG. 3B | Type III "PWRI" Isometric Exploded View |
| 5 of 10 | FIG. 4A | Wiring Diagram - Type I "PWRI" |
| | FIG. 4B | Schematic Diagram - Type I "PWRI" |
| 6 of 10 | FIG. 5A | Wiring Diagram - Type II "PWRI" |
| | FIG. 5B | Schematic Diagram - Type II "PWRI" |
| 7 of 10 | FIG. 6A | Wiring Diagram - Type III "PWRI" |
| | FIG. 6B | Schematic Diagram - Type III "PWRI" |
| 8 of 10 | FIG. 6C | Brass Segment - Polar Schematic |
| 9 of 10 | FIG. 7 | Sine Wave Formation by PWM |
| | FIG. 8 | Sine Wave + $2^{nd}$ & $3^{rd}$ harmonics |
| | FIG. 9 | Basic Pulse Generating Network |
| 10 of 10 - Bird's Eye View of Prior Art Inverters Schematics | | |
| | FIG. 10A | Mutivibrator Inverters |
| | FIG. 10B | Motor Generator Inverters |
| | FIG. 10C | Synchronous Inverters |
| | FIG. 10D | Vacuum & Thermionic Gas Tubes Inverters |
| | FIG. 10E | Function Generator Inverter |
| | FIG. 10F | Solid State Power Inverter |

I. BACKGROUND—FIELD OF INVENTION

This invention falls into the group of "Electrical Power Inverter Systems". It is a "Rotary Electro-Mechanical Device" capable primarily, of inverting direct current energy into alternating current energy, at different frequencies, voltages, and current levels.

II. BACKGROUND—DESCRIPTION OF PRIOR ART

Ref. Dwgs: (Sheet 10 of 10) FIGS. 10A to 10F

The electrical, industrial, avionics, chemical, computer industries and many others, including individuals, regularly requires the need of D.C. to A.C. inverters. These inverters must be capable of translating a source of direct current to Pure sine wave alternating current; not only at 60 cycles but at different frequencies, voltages and current levels. The reason is, most appliances are manufactured to operate at 60 cycles and others at 25 cycles. Also, where transformers are involved, we need alternating current for its operation. In some specialized applications 400 HERTZ (cycles) is commonly required to energize servo-motors, syncros, and control systems. Because 400 HERTZ motors are much smaller and lighter than 60 HERTZ motors, electrical vehicles in many cases, have elected this option. In addition, very specialized electronic equipment utilizes 1500 to 2000 Hertz. Because the emergency power reserve available to some medical and computer groups and others are often Direct Current sources. Here again inverters are needed.

New approaches to old requirements, have evolved over the years. The transmission of high KVA power over long range power transmission lines; in the past was always with alternating current. This is now accomplished with Direct Current power lines. The reasons are (a) better power transmission stability due to the elimination of reactive power imbalance and (b) lower towers, lighter cable weights, shorter cross arms, and less expensive insulators on each tower. All this extrapolates to lower transmission line costs and lower maintenance overhead. Many of these 800 Kilo Volt lines run more than 400 miles. It is obvious that, to convert this high D.C. voltage from the power lines to alternating current power, a super high capacity inverter or many small inverters are required. In this application usually, a tower loaded with hundreds of solid state thyristors and the electronic supporting circuits is the type of inverter now used. This is illustrated on page 1A, for this Specific application The inventor visualizes that his inverter the "PWRI" will do the job at ¼ the cost or less and be ⅕ the size or less. Formerly and contemporarily a variety of inverters have been and are presently available.. Unfortunately, they all suffer from short comings such as (a). Limited power capability. (b). Extremely bulky or statuesque (oversized). (c) very complex. (d). Distorted "Sine wave" shape, due to harmonic contents as illustrated in drawing FIG. 8 (item 88), sheet 9 of 10, (e) and foremost, Extremely and unnecessarily very expensive.

Not to divert further from the Prior art of inverters, please refer to drawing sheet 10 of 10 which reviews existing and prior art D.C. to A.C. inverter methods. In the first instance, FIG. 10A of this drawing shows the multi-vibrator (also known under various names) type of inverter (item 100). This device was developed long ago and originally for extremely low level D.C. inversion for vacuum tube application, with milliwatts capability only. This inverter is limited to very low current level. Because it is an electromagnet that opens and closes platinum points, high sparking due to narrow air gaps between points, is endemic to this type of device. When current and rate of sparking is high enough it is common for points to melt and stick together, and in the process also generate high (RFI) radio frequency interference. This multi-vibrator principle can only generate, at best, a distorted A.C. wave. Interestingly enough, this device has served its purpose at this low power level and was an ingenious creation for its time. Although this Inventor's inverter the "PWRI" does not generate sparks and is not limited in power and generates pure Sine waves, it was not intended by any means to compete with this little old fellow, the multi vibrator.

Now to continue, we will jump to FIG. 10B. Same DWG (item 121). This inverter is known as a "Motor generator" and dates back to the late 1800's. The D.C. input power is fed via inputs (item 104) and drive a D.C. motor (item 123) which is directly coupled by a shaft (item 119) to an alternator (item 122). This alternator generates the desired A.C. power which is fed via outputs (items 105) to the A.C. load. This motor generator can supply a clean Sine wave and has long life and offers reliability. This device however is very expensive and massive; because its motor size must be of the same power level or slightly higher than ;the alternator power capacity, depending on its coupled efficiency. This means that the motor generator has Redundant armature copper and, field iron, as compared with the inventor's inverter "PWRI" which has a motor with capacity only necessary to rotate the Sine wave generating drum segment, which has no iron except the shaft, and is much lighter and less expensive to manufacture. In addition maintenance is much cheaper and efficiency is much better, because of it's mechanical simplicity.

Next we go to FIG. (10C) of same drawing (sheet 10 of 10) we find the Synchronous Inverter which dates back to the early 1900's. This device (item 107) fundamentally is also a motor generator. The difference is that is uses a common armature (item 110) for the D.C. winding (item 111) and A.C. windings (item 112) to generate the ;A.C. output. The operation of this synchronous inverter is as follows. The D.C. supply energy source to be inverted is from inputs (item 104) to a commutator (item 118) via commutator brushes (item 117) then to the D.C. windings (item 111) on the common armature (item 110). The application of D.C. voltage to this armature causes a current to flow in this D.C. armature and generates a magnetic field. When at the same moment a D.C. voltage is also applied to terminals (item 109) to energize the D.C. field coils (108) a D.C. current will build a magnetic field that will react with the D.C. armature field (item 111). This reaction known as motor action will generate torque and rotate the whole common armature (item 110). This rotation will cause the A.C. armature windings (item 112) to cut the magnetic fields that emanates from the fields coils (item 108) and as in all basic alternators will generate an EMF or voltage alternating in nature. This EMF or voltage will cause and A.C. current to flow via the slip rings (item 115) and brushes (item 116) when an output load is connected to its terminals (item 105).

Some of the synchronous inverters generate perfect sine waves (item 85) however in some cases because of the common D.C. and A.C. armature (item 110) some parasitic harmonics have been known to distort the Sine waves (item 120). This system originally was designed for the opposite use; to convert A.C. to D.C. for early electric street cars and other applications where a regulated high output D.C. current was required. The invention has been very successful and most will admit very imaginative in reducing the iron of armature that you find in ordinary motor generator types. The fact still remains that it is still very expensive and unnecessarily heavy and complex. The fact that it requires external excitation and suffers from the same ills as the motor generator is significant; i.e. poor efficiency because the motor windings must take more energy than the alternator windings can deliver. The total efficiency depends on the efficiency of the motor windings and that of the generator windings. Here again this inventor's inverter (PWRI) has a motor that requires only the energy to rotate the Sine wave drum segment around its slip rings; It does not require energy to cause a heavy ferrous A.C. armature to cut & react against the strong magnetic field of the field coils.

Turning to FIG. 10D, we now come to the early electronic type of inverters. These came into being in the 1920–30–40s and some are still in use to this day. They are known as vacuum tubes and gas thermionic tubes inverters. In the class of gas thermionic tubes, the thyratrons gas tubes were the most popular. Although the ignitron gas tube which is a controlled emission mercury pool tube, was also important in certain inverter applications and still very much in demand.

In this FIG. 10D, (item 124) is a block diagram which represents either the Vacuum tubes or the Gas thermionic tubes. "First we will consider the" Vacuum three electrode vacuum tubes or triodes. These were used to convert D.C. to A.C. mostly to act as oscillators of high frequencies for communication purposes. They require a high voltage power supply represented here by block diagram (item 125) which is very expensive and complex, also requires complex grid bias and control feed back circuits; this is represented by block diagram (item 126) and also very expensive. The vacuum tube is limited in power level & requires water cooling for radio station high power, high frequency application. So far, vacuum tubes have not been found practical for D.C. to A.C. power conversion at frequencies below 1500 Hertz particularly at high power levels.

In the case of the Thermionic gas tubes, "mercury pool tubes" which are also represented by block diagram (item 124) in lieu of vacuum tubes; These have been used as inverters with some success if a pure sine wave is not particularly required. This anomaly is caused by a long deionization time of the inert gas in the tube. Here again, complex and expensive grid control and commutating circuits are required, this is represented by block diagram (item 126); again special high voltage power supplies are also required. It is the opinion of the inventor and many other authorities that the thermionic tube approach for D.C. to A.C. inverters is the most expensive way to go, even more expensive than the motor generator and synchronous inverters. In comparison, the inventor's device, the "PWRI", which requires no deionization time, no commutating circuits or power supplies, and no cooling system.

For the sake of complete "Prior art discussion" please refer to FIG. 10E, this figure represents a basic Function Generator "type of Inverter, (item 135). Fundamentally it is two non linear potentiometers with polarity reversing switch. This is accomplished by winding nichrome "high resistive wire" around a circular insulation form in the shape of two half inverse Sine waves. Item (139–140). The wired high resistance forms, actually simulates a non linear or resistance potentiometer whose point to point voltage drops would be the same as the voltage potential along a Sine wave. The non linear potentiometer forms (item 139 & 140) are mounted parallel to two switch plates (item 141 & 142) which serve as a polarity reversing switch. These plates and non linear potentiometers are mounted on a common shaft (item 138) and driven by a motor (item 137). When this motor is turning and a D.C. source voltage is applied to inputs (item 104) an A.C. voltage is generated proportional to voltage drop at wiper (item 136) point. The polarity of the sine wave is determined by contacts of wipers (item 143) on either one of the switch plates (item 141 or 142.) This A.C. voltage frequency in turn is a function of shaft (item 138) speed or RPM, and applied to output terminals (item 105).

This very ingenious device was used in the very early analog flight simulators of the 1950's and in the early analog computers and other specific research programs. It simulated a Pure sine wave function signal voltage. It is quite obvious that it is a power consuming device with limited application. Its main uses are in the area where extremely low power Sine waves are required. Here again this inventor would not attempt to compete with this little fellow either, who so inefficiently can generate such a perfect low power Sine wave.

FIG. 10E Finally comes the "pièce de resistance" ... The "Solid state electronic inverter" system.

The inverter systems under patents Class 321 (as revealed to the inventor and his wife during the patent search at the Sunnyvale, Calif. Patent Office in Dec. 1993) are the most popular and recent methods of power inversions. It appears that in this class the reinvention of the wheel is (a propos). It, however, demonstrates the continuous endeavor to improve the state of the art, of solid state electronic devices, be it transistors or thyristor methods. These systems however, have no resemblance whatsoever to the inverter device suggested by the inventor. Yet the patent class 321 offers techniques highly advanced and can be simulated in this inventor's unique device.

In FIG. 10F Block diagram (item 128) is embodied either the power transistors or power thyristors with Associated, exotic, complicated and expensive commutations integrated circuits or bias Turn on, Turn off circuits in block diagram, (item 129) or with computer assisted commutated Turn on, Turn off programs in block diagram (item 130). Shown in dotted lines Under the Power transistors class solid state devices available for above inverters we have:

1) BJT—(Bipolar Junction Transistors)
2) MOSFETS (Metal oxide semiconductors field effect transistors)
   (D) Depletion type
   (E) Enhancement type
3) 1 GBT—(Insulated gate Bipolar Transistors)
4) SIT'S (Static induction transistors (for high power high freq)

Under the Thyristor class solid state devices available, we have:

1) PUT (Programmable Unijunction Transistor PNPN (thyristor device)
2) SCR (Silicon control rectifiers)
3) GTO (Gate turn off thyristor)
4) TRIAC (Bi-directional Triode Thyristors)
5) RCT'S (Reverse conduction Thyristors)
6) SITH'S (Static induction Thyristors)
7) LASCR'S (Light activated silicon control rectifiers)
8) FET-CT'S (Field effect control Thyristors)
9) MOS-CT'S (Metal oxide—control Thyristors)
10) ASCR'S (Asymmetrical silicon control rectifiers) (very fast turn off Thyristors)

Because of the later year's fast advance in Power Transistors, the thyristor application such as SCR'S (silicon control rectifiers) Sinusoidal inverters are reserved mainly for very high power inverters. Particularly as previously mentioned on page 1, for the H V D C (high voltage DC) power transmission in the range of 100 kilo volts to 1 million volt lines, and distances from 400 to 1000 miles.

The inversion of this high powered D.C. to A.C. 60 Hertz at the terminal end of these transmission lines is accomplished by complicated and costly Electronic solid states Sinusoidal pulse width modulation (SPWM) thyristor systems. These (SPWM) sinusoidal pulse width modulation thyristors systems and exotic heat sinks are corded in series parallel, in towers similar to the typical one shown. One can just imagine the amount of solid state units in one of these towers, by observing the two workers at the base of the electronic solid state systems tower; The cost is obvious. However this approach delivers a very satisfying Sine wave under ideal conditions.

Here again this inventor's Inverter "PWRI" could no doubt convert this 500 megawatt amount of power with approx. ⅓ the size & weight at probably less than ⅓ the cost. The complicated "SPWM" Sinusoidal pulse width associated commutating circuits of these Thyristor systems are not required with this inventor's device, because the SPWM capability of the electronic Thyristor complicated circuits, is not endemic to the construction of the "PWRI" inverter. One of the handicaps of solid state devices, and Thermionic devices, and in spite of its complicated & efficient commutating & associated circuits, is the inherent Time on & Time off reliability for low delay. In the Thermionic gas tubes this can be explained in terms of Ionization time & Deionization time. In solid state the same but more complicated Ionization & Deionization is in order. Contrarily in this inventor's "PWRI" inverter device; it is either on or off depending on whether the brush is making contact with a conductive segment or not, and it must not be overlooked, it is much less limited in current carrying capacity.

III. OBJECTIVE AND ADVANTAGES

In addition to being an inverter of D.C. to A.C. power as herein previously described; The inventor's device can perform other functions as follows:

(a) It can perform as a Cycloconverter i.e. it can convert A.C. power of one frequency to a higher or lower frequency at higher current level than present solid state Cycloconverter units.

(b) It can also convert D.C. to Polyphase A.C. for Higher power application.

(c) It can be used as a source of variable frequency power for motor control.

(d) With modifications of the copper segments widths and insulated spacing widths, any form of wave shape can be generated at a specific frequency for high power; should a requirement ever develop.

It also has a number of advantages:

(a) It does not require complex windings and lots of iron as found in Synchronous converters.

(b) No complex heat sink is required such as in electronic solid states inverters.

(c) Does not need water cooling such as in electronic vacuum, gas or mercury tubes.

(d) No complex Sine wave commutating electronic support circuits such as in electronic solid states inverters or in thermionic gas tube systems for High power application.

(e) No expensive turn "off" capacitors required such as in some SCR inverters.

(f) Since it is not current limited; it can be constructed in large unit size; unlike the high number of multi units solid state inverters required to handle a load such as shown in the tower.

(g) This device can also be built, ruggedized with no narrow band of heat sensitivity or sharp current limitations found in Thyristor systems.

(h) When this device is to supply an A.C. output load at the same voltage level as the D.C. Source Voltage level; a polarity reversing segment driver switch and its electrical collector brushes can be used for the D.C. source return. However, this rotary driver reversing switch can be eliminated by making use of center tap output transformers for the A.C. load; or by employing a number of extra sine wave generating drums and feeding of the A.C. output through a three phase Star connected transformer and with the Star center tap as the D.C. return.

(i) Since all the collector brushes travel on slip rings and smooth surfaces even between segments, unlike commutator type brush contacts, no RFI (radio frequency interference) is generated, & no abrasion exists.

(j) As an electro-mechanical device it will also have longer life & higher index of reliability than existing electronic inverter devices.

(k) The initial, & life cost of this inverter and its basic simplicity for power inverters are by far the greatest of all its advantages.

IV. DESCRIPTION OF DRAWINGS AND SCHEMATICS

Because we are showing here dwgs for 3 basic applications of the inventor's device, it is appropriate here to list these, to prevent ambiguity.

(a) We have the basic pulse width rotary inverter FIG. 1A, sheet 1 of 10. For application with center tap transformer when A.C. voltage is required to be raised higher than the D.C. source voltage.

(b) The basic inverter with an additional polarity reversing switch FIG. 1B, sheet 1 of 10, this in lieu of center tap transformer where A.C. voltage level required is same as D.C. source voltage.

(c) Three (3) basic inverters mounted on same shaft FIG. 3B, sheet 4 of 10. This, to generate 3 phrase A.C. power.

Because of the above, the dwgs are organized in four (4) basic groups.

(a) Isometrics of the Inverter devices. FIGS. 1A & 1B, sheet 1 of 10, followed by isometric exploded views FIGS. 2 (sheet 2 of 10), 3A (sheet 3 of 10) & 3B (sheet 4 of 10).

(b) Wiring & schematics of the units shown above, i.e. FIGS. 4A & 4B (sheet 5 of 10); 5A & 5B (sheet 6 of 10); and 6A & 6B (sheet 7 of 10). Schematics for 3 phase drum orientation is shown on FIG. 6C (sheet 8 of 10).

(c) Graphic rendition of Sine wave generated from a train of different pulse widths and polarity FIG. 7 (sheet 9 of 10). Plus a Fourier analysis demonstrating a Sine wave with harmonics. FIG. 8 (sheet 9 of 10) Also a very basic pulse generating network FIG. 9 (sheet 9 of 10).

(d) A complete birds eye view by schematic & block diagram of prior and present state of the art of D.C. to A.C. inverters.

(e) Each dwg sheet is Described as follows:

DWG Sheet 1 of 10

On this sheet we have two (2) isometric views of the invention: FIG. 1A shows the isometric view of the Inverter device with Sine wave generating drum only (item 21) with D.C. supply and A.C. output collector brushes (item 29 & 27). This is intended for application with a center tap transformer when D.C. voltage is to be raised to a higher level in addition to the inversion as shown further in FIG. 4A (item 55).

FIG 1B Shows the isometric view of the device with Sine wave generating drum plus a polarity reversing segment (item 37) for application without a center tap transformer, when A.C. voltage requirement to the load is the same as voltage of the D.C. source.

In this FIG. 2 we have an isometric exploded view of FIG. 1A shown on sheet 1 of 10.

In this FIG. 3A we have an isometric exploded view of FIG 1B shown on sheet 1 of 10.

In this FIG. 3B we have an isometric exploded view of the Inverter with 3 Sine wave generating drum assemblies for one shaft (for D.C. inversion to 3 phase A.C).

In this FIG. 4A we show a wiring diagram of the Inverter device shown in FIG. 1A with center tap transformer application. (Item 55)

FIG. 4B (same sheet) we show a schematic for FIG 4A. Since this is a new inverter concept, (item 51 is here used to symbolize the Sine wave generating segment (item 21) of the above (FIG. 1A) on sheet 1 of 10.

FIG. 5A shows a wiring diagram of the inventor's device shown in FIG 1B. With polarity reversing segment (item 37) for application without center tap transformer.

FIG. 5B shows a schematic of the above, in FIG. 5A (Same symbol remarks as mentioned for FIG. 4B applies here). Remark also applies to (item 64) to symbolize polarity reversing segment).

Sheet 7 of 10

FIG. 6A on this sheet shows a wiring diagram of the 3 phase Inverter device shown in FIG. 3B, on (sheet 4 of 10). It shows an Inverter with three (3) Sine wave generating drums same as (item 21) in FIG. 1A (sheet 1 of 10) and FIG. 4A (sheet 5 of 10), except that these Sine wave drum segments (item 73, 74, 75) are mounted on a common shaft 120° off set from each other. This arrangement generates a 3 phase A.C. power output and feeds to a Wye-Delta transformer output, shown here in.

FIG. 6B shows a schematic for the above in FIG. 6A showing 3 Sine wave generating segments (item 73, 74, 75). Here again, since these Sine wave generating segment drums are new devices, the symbols 73, 74, 75), are used to symbolize these new devices in a 120° out of phase arrangement. (The same remarks about symbolism in FIG. 4B (sheet 5 of 10) applies here also).

Sheet 8 of 10

FIG. 6C on this sheet shows 3 polar coordinate diagrams. This is to illustrate how the 180° brass segments (item 25) of each Sine wave generating drum assembly are orientated and mounted 120° offset from each other, on the common shaft (item 63) for 3 phase inverter system.

Sheet 9 of 10

FIG. 7 illustrates fundamentally how a Sine wave (item 83) formation is generated by positive & negative pulses of different widths & spacings (typical item 82 & 80).

FIG. 8 Illustrates a Fourier series of a Sine wave (item 85) plus 2nd & 3rd harmonics (items 87 & 86) and its resultant wave shape (item 28) This to illustrate the benefits of "PWM", or Pulse Width Modulation.

FIG. 9 Shows the most basic pulse generating network, consisting of a switch (item 90) a lamp (item 91) energized by a D.C. voltage source (item 92) and a voltmeter (item 93) across the lamp L1. (Item 91)

Sheet 10 of 10

The figures on this sheet illustrate with a birds' eye view, the fundamental status of prior art in D.C to A.C Inverters.

FIG. 10A

Shows a multivibrator (item 100) which is an electromagnet device for converting very low level D.C. signals into A.C. This device generates a distorted square wave (item 106).

FIG. 10B

Shows the very efficient, but massive and expensive Motor generator inverter. (Item 121)

FIG. 10C

Illustrates the complicated, very massive and expensive device known as a Synchronous inverter. (Item 107) This schematic illustrates a rotary inverter where the D.C. armature and A.C. inverting armature are one common armature with D.C. input commutator, and A.C. output slip rings are mounted on the same shaft.

FIG. 10D

Illustrates by block diagram yesterday's electronic Vacuum tube & gas Thermionic tube type inverters (item 124) and its D.C. voltage supply (item 125) with control and timing circuits (item 126). These are also power limited mostly by their very high initial maintenance cost and cooling problems.

FIG. 10E

This is a schematic of a Sine wave function generator see (item 135). This device is a power consuming device, Very, very, inefficient, power wise. However it is practical as a pure Sine wave function generator of extremely low power, for R & D.

FIG. 10F

Illustrates the contemporary solid state power limited Electronic inverters (item 128); with their expensive and complicated commutating and computer timing programmed circuits (item 129 & 130)—not to mention its limited reliability.

V. REFERENCE NUMERALS IN DRAWINGS (FIG. 1A to FIG. 10F) inclusive

| ITEM # | DESCRIPTION |
| --- | --- |
| 20 | Mounting base for FIG. 1A type I "PWRI" |
| 20a | Mounting base for FIG. 1B type II "PWRI" |
| 20b | Mounting base for FIG. 3B type III "PWRI" |
| 21 | Sine wave generating drum assembly. |
| 22 | Drum shaft support. |
| 23 | Sine wave generating drum and motor shaft support. |
| 24 | Variable pulse width generating brass segments. |
| 25 | Pulse width generating segment assembly. |
| 25a | Pulse width generating segment common slip ring. |
| 26 | Molded insulation drum structure. |
| 27 | Pulse width segments collector brush-holder. |
| 28 a & b | Positive or negative pulse width segment's collector brushes. For TYPE I & II "PWRI" |
| 28 c,d,e,f,g,h, | Positive or negative pulse width segment's collector brushes. For TYPE III "PWRI" |
| 29 | Pulse width common slip ring collector brush holder for Type I & Type II "PWRI". |
| 29 a,b & c. | Pulse width common slip ring collector brush holder for Type III "PWRI" for (items 73,74,75) assemblies. |
| 30 | Pulse width common slip ring collector brush for Type I & Type II "PWRI." |
| 30 a,b, & c | Pulse width common slip ring collector brush for Type III "PWRI" for (item 73,74,75) assemblies. |
| 31 | Brush holder's mounting rods. |
| 32 | Drum and motor shaft. |
| 33 | D.C. electric motor. |
| 34 | D.C. motor input power leads. |
| 35 a & b | A.C. leads to center tap transformer load. |
| 36 | Leads to D.C. supply source, for type I & type II "PWRI." |
| 37 | Sine wave generating and Polarity reversing drum assemble, for type II "PWRI." |
| 38 a & b | Pulse width segments, brush leads to D.C. source for type II "PWRI". |
| 39 | Leads to A.C. load from pulse width common segment for type II "PWRI." |
| 40 | Leads to A.C. load from (Polarity reversing segment) for type II "PWRI". |
| 41 | Polarity reversing common segment brush holder. |
| 42 | Polarity reversing common segment collecter brush. |
| 43 | Polarity positive & negative reversing segments brush holders. |
| 44 a & b | Positive & negative Polarity reversing segment, collector brushes. |
| 45 a & b | Lead to D.C. supply source for Polarity reversing segment, collector brushes. |
| 46 | Non conductive surface. |
| 47 | Polarity reversing segment assembly. |

-continued (FIG. 1A to FIG. 10F) inclusive

| ITEM # | DESCRIPTION |
| --- | --- |
| 47 a & b | Positive & negative Polarity reversing segments. |
| 48 | Polarity reversing common segment slip ring, |
| 49 | Not appropriated |
| 50 | Type I "PWRI" assembly. (As shown in FIG. 4A & 4B) dwg sheet 5 of 10. |
| 51 | Rotating sinusoidal pulse width generating segment, shematic symbol for type I & II "PWRI." |
| 52 | Not appropriated |
| 53 | D.C. motor speeds control (optional) |
| 54 | Not appropriated |
| 55 | Center tap transformer, A.C. load. |
| 56 | A.C. load |
| 57 | D.C. Power source. |
| 58 | Not appropriated |
| 59 | Center tap return to D.C. source lead |
| 60 | Not appropriated |
| 61 | D.C. source to motor speed control leads or connection. |
| 62 | Variable D.C. power level to D.C. motor cable. |
| 63 | Motor and Sine wave generating drum shaft for TYPE III "PWRI". |
| 64 | Polarity reversing segment symbol (see shematic FIG. 5B) (symbol). |
| 65 | Type II "PWRI" assembly. (Shown in dotted lines in FIG. 5 & 5B dwg sheet 6 of 10). |
| 66 | A.C. leads from Sinusoidal generating segments to phase "A" of power transformer. |
| 67 | A.C. leads from Sinusoidal generating segment to phase "B" of power transformer. |
| 68 | A.C. leads from Sinusoidal generating segment to phase "C" of power transformer. |
| 69 | Output leads from 3 phase power transformer to A.C. load. |
| 70 | Primary WYE windings (3 phase power transformer). |
| 71 | Secondary (STAR) or DELTA windings of 3 phase power transformer. |
| 72 | Power transformer 3 phase (WYE DELTA ASSY). |
| 73 | Sine wave generating drum segment assy phase "A". |
| 74 | Sine wave generating drum segment assy phase "B". |
| 75 | Sine wave generating drum segment assy phase "C". |
| 76 to 79 | Not appropriated |
| 80 | Positive "PWM" train. |
| 81 | Negative "PWM" train |
| 82 | Typical individual pulses with different pulse durations. |
| 83 | Sine wave generated "PWM" pulse trains. |
| 84 | Sine wave containing first and second harmonics. |
| 85 | Sine wave fundamental (pure Sine wave). |
| 86 | Second harmonic. |
| 87 | Third harmonic. |
| 88 | Resultant wave shape. (FIG. 9) |
| 89 | Very basic pulse generating network. |
| 90 | Switch (SPST). |
| 91 | L1 (incandescent electric bulb.) |
| 92 | D.C. constant voltage source. |
| 93 | Voltmeter "VM." |
| 94 to 99 | Not appropriated. |
| 100 | Multivibrator. |
| 101 | Electromagnet. |
| 102 | Movable pole SPDT (Single pole double throw). |
| 103 | Contact points. |
| 104 | D.C. power input |
| 105 | A.C. output voltage. |
| 106 | A.C. output approximate wave shape. |
| 107 | Synchronous inverter. |
| 108 | Field coils. |
| 109 | Field coil inputs to exciter voltage. |
| 110 | Inverter D.C.-A.C. common armature. |
| 111 | D.C. Voltage input windings. |
| 112 | A.C. voltage output windings. |
| 113 | D.C. windings, leads to commutator. |
| 114 | A.C. windings, leads to slip rings. |
| 115 | Slip rings |
| 116 | Slip ring's collector brushes. |
| 117 | Commutator collector brushes. |

-continued (FIG. 1A to FIG. 10F) inclusive

| ITEM # | DESCRIPTION |
| --- | --- |
| 118 | Commutator |
| 119 | Common shaft. |
| 120 | Output wave form with harmonics. |
| 121 | Motor generator (FIG. 10B). |
| 122 | Alternator. |
| 123 | D.C. motor. |
| 124 | Vacuum Tubes and Ionic Gas Tubes Inverter namely - Thermionic Vacuum Tubes and Ionic gas tubes such as Ignitrons & Thyratrons and mercury tubes. |
| 125 | High D.C. voltage power supply. |
| 126 | Control grids and timing electronic circuits. |
| 127 | Non - sinusoidal output wave form. |
| 128 | Solid state inverters namely transistors - SCRS, IGBT, MOSFETS, etc. |
| 129 | Electronic timing and turn-off circuits. |
| 130 | Computerized control logic programs. |
| 131 to 134 | Not appropriated. |
| 135 | Sine wave function generator. |
| 136 | Non linear potentiometer's wiper collector rotating arm. |
| 137 | D.C. driving motor or servo motor. |
| 138 | Driving shaft. |
| 139 | Negative non-linear potentiometer segment part. |
| 140 | Positive non-linear potentiometer segment part. |
| 141 | Negative polarity switching card segment. |
| 142 | Positive polarity switching card segment. |
| 143 | Polarity segment switching card wiper collector rotating arm. |

VI. DESCRIPTION OF INVENTION

Drawings in 9 figures to describe "PWRI".

This device, namely, "Pulse Width Rotary Inverter", and as previously abbreviated, will be referred to as "PWRI". This inverter prototype construction is fully developed in the accompanying drawings in 9 figures with sub figures of mechanical, wiring, schematic & graphical characteristic views. These are drafted on 9 of 10 drawing sheets. Because the inventors device lends itself to (3) different arrangements or types; basic isometrics, and isometric exploded views plus different wiring diagrams, and schematics are shown for each of the 3 types. It is to be noted that this is a description of the inventor's inverter working prototypes and not some fictitious paper inverter. The physical construction of this invention is by no means limited to this prototype's physionomy & parameters. Several other packaging forms & arrangements were not only considered, but some were implemented and rejected in favor of the one in question. Further concepts will be developed at a later date when production types of "PWRI" development is considered.

The inventor's inverter "PWRI" is shown in 3 basic types of application: (1st) The type I "PWRI" (Pulse Width Rotary Inverter) is the basic Pulse Width Rotary Inverter device, for application with a center tap transformer for converting the D.C. source voltage to an A.C. voltage & raising this voltage to a higher level. (2nd) TYPE II "PWRI" is the basic Pulse Width Rotary Inverter with a polarity switch when no transformer is required such as when the D.C. voltage is of sufficient level so that its inverted voltage is applied directly to the A.C. load. As previously discussed this rotary polarity reversing switch can be totally dispensed with. (3rd) TYPE III "PWRI" is a 3 phase D.C. to A.C. Pulse Width Rotary Inverter. Here 3 basic "PWRI" inverter drums are mounted on the same shaft, but these Sine wave generating drum brass segments are mounted and aligned 120° from each other. (See FIG. 6C sheet 8 of 10) for brass segment alignment). The A.C. output of the rotors is fed to a 3 phase WYE-DELTA transformer.

Now to describe the device in terms of dwgs; we will go first to: FIG. 1A of (sheet 1 of 10). There we show the isometric view of type I "PWRI" which is for application with a center tap transformer as shown in wiring diagram FIG. 4A & schematic FIG. 4B, (item 55) both on sheet 5 of 10. In the isometric view FIG. 1A (sheet 1 of 10) & exploded view FIG. 2 (sheet 2 of 10) we show the Sine Wave generating drum segment assy (item 21) and its shaft (item 32) mounted on a base (item 20) between the two vertical supporters (item 22 & 23) & driven by a D.C. Motor (item 33) with input D.C. leads (item 34 & 35a). The Sine wave generating drum segment assy (item 21) consists of a copper shell with different electrically conductive brass segments of different widths (item 24) in between which space also of different widths exists for insulating segments. This copper shell or namely the "Pulse width generating segment assembly" (item 25) shown on (sheets 1 to 7 is casted over a molded insulation drum (item 26) into which was inserted a shaft (item 32) at time of casting. This previously referred shaft (item 32) is coupled to the D.C. motor (item 33) which rotates the Sine wave generating drum (item 21) when D.C. voltage is applied to leads 34 & 34A. Also mounted between the two mounting plates (item 22 & 23) are two brush holders (item 24 & 27) supported by rods (item 31). Inserted inside the brush holders are spring loaded electrical bronze collectors (items 28 & 30). On brush (item 30) a wire lead (item 36) is connected thereon and the other end of the wire lugg is connected to the inverter D.C. source (item 57) negative terminal (also shown on dwg sheet 5, 6, & 7). On brushes (items 28a & b) leads (items 35a & b) are connected from each brush to a center tap transformer (item 55) terminal shown on wiring and schematic dwgs (sheet 5 of 10).

On FIG. IB of (sheet 1 of 10) & FIG. 3A (sheet 3 of 10) we show isometric view & exploded isometric view of type II "PWRI" which is for application without a center tap transformer. Actually, it is the same device as shown on FIG. IA plus the addition of a polarity reversing segment (item 47) with additional collector brushes & holders. (Item 41, 42, 44 & 43) This permits feeding directly to an A.C. load without a center tap transformer. The copper shell polarity reversing segments (item 47) & polarity reversing segment slip ring (item 48) is added by casting it on the same drum assembly (item 26) & on the same common shaft (item 32). Also added & mounted on the same support rods (item 31) as in FIG. 1A are two brush holders (item 41 & 43) into which are also inserted spring loaded electrical bronze collector brushes (items 42, 44a & b). On brush (item 42) a lead (item 40) is connected there on and to the other end of this lead is lugg connected to the external A.C. load. (Item 56). On brushes (item 44a) a lead (item 45a) is connected to lead (item 38b) and to the positive side of the D.C. power source (item 57). On brush (item 44b) a lead (item 45b) is connected to lead (item 38a) and to the negative side of the D.C. power source (item 57). It is to be noticed and as shown on wiring diagram FIG. 5A (sheet 6 of 10) & schematic Diagram FIG. 5B (sheet 6 of 10) that electrical connections are different for Type II "PWRI" (sheet 1 of 10) when compared to Type I "PWRI" (sheet 1 of 10). This is mainly due to the addition of the polarity reversing segment (item 47a & b) to type I "PWRI." This, in fact, replaces the center tap transformer. It is to be noted here that the reason this reversing segment is added, is to accommodate the condition where the D.C. voltage is not required to be raised to a higher voltage level. When the voltage is required to be raised to a high value the reversing switch is not required if a center tap transformer is available.

Also, as mentioned previously, when this device is designed & developed for higher power application, the rotating reversing segment drum (item 47) and its collector brushes can be completely eliminated. This makes it possible to supply A.C. power directly to an A.C. load with a center tap transformer.

In FIG. 3B (sheet 4 of 10) type III "PWRI" inverter is an isometric exploded view of this device for application where we invert D.C. power from one source to 3 phase A.C. power. This is also illustrated on FIG. 6A & schematic 6B, both on dwg (sheet 7 of 10). The actual physical layout of type III is very similar to that of FIG. 1A TYPE I "PWRI" inverter; except that here in FIG. 3B we have the three (3) Sine wave generating drum segment assemblies, which have been re-itemized as (items 73, 74, & 75) & mounted on the same but longer shaft (item 63) between two vertical supports (items 22 & 23) all on base (item 20b). This shaft is driven by D.C. motor (item 33) with its input D.C. leads (item 33 & 34a) & connected as per FIGS. 6A & 6B on dwg (sheet 7 of 10).

To offer the 120° electrical phase shift of the standard three (3) phase electrical system, the three (3) Sine wave generating drum brass segments (item 73, 74, & 75) are aligned mechanically, 120° offset from each other around the shaft. This is schematically illustrated in FIG. 3B (sheet 4 of 10) also in FIGS. 6A & 6B (sheet 7 of 10) and particularly in FIG. 6C on sheet 8 of 10. Since we now have three (3) A.C. Generating drum segments we also have to add additional electrical collector brushes and brush holders. First, we have three (3) Pulse width common slip ring collector brush holder (items 29a, b, & c) mounted between the two (2) mounting plates (item 22 & 23) and supported by rods (item 31). Inserted inside these brush holders are the spring loaded electrical collector (preferably bronze) brushes (item 30a, b, & c). On these brushes are connected leads (items 38a) and connected in common via lead (item 38) to the negative side of the D.C. source supply (item 57). This is shown on wiring & schematic diagrams FIGS. 6A & 6B dwg (sheet 7 of 10). In the same manner, on the opposite side of the 3 drum assemblies (item 73, 74, 75,) are mounted 3 Pulse width segments double brush holders (item 27). Inside these brush holders are the spring loaded electrical collector (preferably bronze) brushes (items 28c, 28d, 28e, 28f, 28g, & 28h). On the brushes, leads (items 35a, b, c, d, e, & f) are connected there on, and as shown on wiring diagram & schematic (FIGS. 6A & 6B) of (sheet 7 of 10) these leads are only connected to leads 66, 67, & 68 which feed to the windings (item 7) of WYE-DELTA, 3 phase power transformer. (Item 72). Lead (item 59) from the WYE windings (item 70) return to the D.C. source supply (item 57).

VII. OPERATION & FUNCTIONING

Now that I have fully described the static, physical construction, shape & various forms of this innovative rotary Inverter i.e "PWRI". I will endeavor to present a palatable explanation of how this Variable pulse width rotary inverter functions & operates.

To begin with, a number of years has elapsed since this inventor had designed solid state SCR'S & Transistorized D.C. motor controls & D.C. to A.C. inverters using the PWM (pulse width modulation technique). After retiring at 62 years of age, some twelve years ago, I kept up with the state of the art of many engineering disciplines, including that of D.C. to A.C. Inverters. Much time, between heart attacks, was invested in research & development of electro-mechanical & electro-chemical devices. In late 1993 someone, actually another engineer, expressed the desire that I come forth with a more economical & with possibly a longer life span D.C. to A.C. inverter and primarily with higher power capability. The "PWRI" inverter is the result of the attempt.

This ingenious device (if I may say so) works on the principle that: A rotating Train of Positive pulses followed by Negative pulses, with each succeeding pulse having a specific increasing and decreasing Time on, and Time off, can generate a Sine wave. The frequency of which will be a function of the pulse train rotation past a specific point per unit of time.

To better illustrate, refer to FIG. 9 on dwg (item 89) (sheet 9 of 10) which shows a basic pulse generating network. It is a fundamental fact that when switching on and off a specific voltage source across an incandescent lamp, the lamp's brightness & intensity will vary in proportion to the rate of switching speed, the length of time the switch is on and the length of time the switch is off. If we measure the voltage across the bulb (item 91) with a voltmeter (item 93) we will observe that when we close & open the switch (item 90) with a series of very narrow Time on & Time off, the voltage indicated by Voltmeter (item 93) across lamp (item 91) will be very low, and, as a matter of fact, much less than the source voltage (item 92). Hence, the lamp (item 91) brilliance will be proportionally very low. However, if the switching On & Off Time is increased, the average voltage across the lamp will increase & so its brilliance. Further increase in switching On & Off Time will continue to increase the average lamp voltage & brilliance.

This above approach is used also in controlling the speed of some electrical motors, but in lieu of a manual switch, a solid state electronic device, such as a power transistor, or SCR (Silicon control rectifier) & others referred to as Thyristor or in Europe as valves, is taking its place. Here very complex exotic & expensive circuits are used to control the actual time on and time off to the microseconds. This technique is referred to in industry as "PWM" or pulse width modulation. The circuits used to control the pulse width on and off are referred to as "Electronic Commutating Circuits". This term was previously mentioned in the prior art portion of this write up and in the block diagram (item 129) of FIG. 10F dwg (sheet 10 of 10) and as computer assisted pre-programmed commutation & referred to, in the block diagram (item 130) of same figure & drawing.

Now in lieu of generating by means of the above a variable voltage to control lamp intensities; we use this same principle for motor speed control or other services by generating narrow to wide pulse width. We may wish to generate a specific pulse train such as shown in FIG. 7 (item 80 & 81) dwg (sheet 9 of 10) capable to yield a pure Sine wave (item 83) of same dwg sheet. This is the approach commonly used in "State of the art" for PWM (Pulse width modulation) D.C. to A.C. inverters. To obtain this perfect Sine Wave; very exotic & complex, expensive & low life electronic solid state commutating circuitry & power Thyristors or electronic valves as referred to in Europe are required. This inventor knowing of the short comings and exorbitant cost, plus power limitation of electronic inverters and other systems, but also aware and recognizing the value of the basic PWM (Pulse width modulation) Technology; has conceived an electro mechanical way, of producing a specific pulse train to generate a Sine wave from a D.C. voltage source such as shown in FIG. 7 (item 82 & 81). Thus applying the "PWM" technology to electro mechanical inverter. This new system, or device, which is completely devoid of electronics components, consists of a D.C. motor driven Sine wave generating segment (item 21) shown in this first instant in FIG. 1A of DWG (sheet 1 of 10) and FIGS. 4A & 4B wiring & schematic on drawing (sheet 5 of 10), for Type I "PWRI" as generally described under the heading: DESCRIPTION OF THE INVENTION" in paragraphs "TYPE of PWRI".

This Sine wave generating drum segment (item 21), as previously described, consists of a copper shell assembly (item 25) same dwg's, inserted on the surface of the molded insulation drum structure (item 26). This copper shell assy (item 25) has electrically conductive brass segments (item 24) of different widths and different spacings between segments. The spacing between segments (preferably copper) consists of non electrically conductive smooth surfaces (item 46). To generate a full Sine wave, as mentioned above, the segments of the electrically conductive shell assembly (item 21) are divided into two groups around and opposite each side of the drum and interconnected by a common brass slip ring (item 25).

To generate the narrow to wider and wider to narrow pulses required to generate voltages from zero to maximum and from maximum back to zero for the positive side of the Sine wave, the group of segments on one side of the drum (item 21) is arranged in an ascending manner, from narrow copper segments to wider copper segments & in descending manner from wider to narrower copper segments. This group of segment occupies 180° of the drum circumference, and generates parts of the pulse train illustrated in FIG. 7 (item 80 & 82) on DWGS (sheet 9 of 10). To generate the pulses for the negative side of the Sine wave, the group of copper segments on the opposite side of the drum are arranged in the same manner of above ascending & descending narrow to wider & wider to narrower copper segments, and occupy the other 180° of the drum as illustrated in FIG. 7 (item 81 & 82) sheet 9 of 10.

One complete Sine wave of alternating voltage is generated when one rotation of the drum is completed and when direct current voltage from D.C. source (item 57) is applied between the collector brush (item 30) on the common slip ring (item 25) of the drum (item 21) and successively & alternately between the two copper segment groups (item 80 & 81) FIG. 7 (sheet 9 of 10) and collector brushes (item 28a & 28 b) FIG. 4A (sheet 5 of 10).

If we refer to wiring diagram FIG. 4A & schematic FIG. 4B on (sheet 5 of 10), we will notice that the polarity reversing of the Sine wave voltage is accomplished via a center tap transformer (item 55) sheet 5 of 10; i.e. when it is desired to raise the basic D.C. voltage source. The return flow of electrons from collector brushes either (item 28a or 28b) and either transformer leads (item 35a or 35b) is via the center tap & lead (item 59) back to the positive terminal of the D.C. source (item 57).

Now going back to the rotation of the said drum (item 21), if it is completed in one second it will generate one whole "Sine wave" during this period and the frequency of said Sine wave will be one cycle or one Hertz per second. Now if we increase the speed of the D.C. motor (item 33) so that the drum rotates 25 times in one second it will generate 25 Sine waves in this period or 25 Hertz per second. If we desire an alternating voltage of 60 Hertz or 400 Hertz, it is clear from previous premises that we will have to provide a D.C. motor with higher rotation so the drum will rotate at 60 or 400 revolutions per second. In terms of MOTOR RPM (revolution per minute) the D.C. motor will have to rotate at 3600 RPM or 24000 RPM. Note that the D.C. motor capacity is only required to rotate the Sine wave generating segment drum & polarity reversing segment assembly with only the friction load of the brushes against a smooth surface. The motor need not have (Horse Power) capacity to generate A.C. power as in the case of the Motor generator Type inverter or Synchronous inverter.

Now I shall endeavor to develop the operation and functioning of TYPE II "PWRI" INVERTER as generally described on previous pages under the heading of "Description of Invention" (page 12) in paragraph "Types of PWRI". The type II, "PWRI" Inverter operates and functions on exactly the same principle as TYPE I "PWRI" Inverter with the exception that: To the "Sine wave generating drum assembly" (item 21) of FIG. 1A we have added an extra assembly, namely the "Polarity reversing segment assembly (item 47) shown on FIG. 1B (sheet 1 of 10) and FIG. 3A (sheet 3 of 10). This addition can be on a separate drum, or a longer common drum, mounted on the same but longer shaft. The purpose of this additional polarity reversing segment, is to apply the proper Positive or Negative polarity to the proper Sine wave generating segments, when one complete half of a Sine wave is generated. This is used when the D.C. level source voltage is satisfactory for a particular A.C. load voltage requirement. This additional polarity segment (item 47) actually replaces the center tap transformer (item 55) for type IA "PWRI".

To better understand the actual operation of this "Polarity reversing segment assembly" we will refer to the wiring & schematic FIGS. 5A & 5B of DWG (sheet 6 of 10). Here we will observe that the D.C. source (item 57) is fed and returned alternately to the "Polarity reversing segment assembly," at either collector brushes, (items 44a or 44b) via leads (items 45a or 45b). The A.C. current to the load (item 56) is from the two collector brushes, (1st) (item 30) on the "Sine wave generating segment common slip ring" (2nd) from (item 42) on the "Polarity reversing segment slip ring." Also one must notice that the actual wiring for type I "PWRI" is quite different than with type II "PWRI". However, all electrical characteristics are the same. TYPE III "PWRI" 3 phase inverter is nothing more than a system which consists of; (3) three units of TYPE I "PWRI" inverters mounted on the same but longer shaft and oriented 120° off set from each other. This is shown in FIG. 3B (sheet 4 of 10) and previously covered in the section VI "Physical static description of the invention" as a (3) three phase D.C. to A.C. inverter.

To show the obvious potentialities of this new device, I will further describe its operation and functioning, by first referring to FIG. 6A wiring diagram and 6B schematic and FIG. 6C showing the 120° OFFSET alignment of each "Copper segment assy" (item 25) on the shaft. Each of these Sine wave generating drum assemblies functions the same as Type I "PWRI" inverter and generate specific pulse trains of different pulse widths from a D.C. voltage source. By rotating these pulse trains we create Sine waves of frequencies proportional to shaft rotation speed, as previously explained in this section.

The essential difference with type III "PWRI" system and type I and II system, is that there are three (3) "Sine wave generating drum assemblies" (item 73, 74, 75) and the unit generates (3) three phase A.C. power in lieu of the single phase power. The (3) three Sine wave generating drum segments are mounted on a same common shaft (item 63) DWG (sheet 4 of 10) & (sheet 7 of 10) and are oriented or keyed 120° out of alignment with each other as illustrated in FIGS. 6A, B & C) DWGS (sheet 7 & 8 of 10). This arrangement is theoretically similar to the three separate armature windings in a basic (3) three phase Alternator, except that the only similarity begins & ends here. Because of the physical orientation of each Sine wave generating segment, the output alternating voltages of drums will be out of phase with each other. As shown in FIGS. 6A and 6B (sheet 7 of 10), when negative D.C. source is applied via leads (item 38a) to each Sine wave generating drum common collector brush (items 30a, 30b & 30c) and via the positive and negative segments of various width copper and insulation surfaces, on each drum, a (3) three out of phase Sine wave voltages with 120° phase shift, will be generated at the rotating segment collector brushes (item 28c, 28d, 28e, 28f, 28g & 28h) in the same way as was described in TYPE I "PWRI" inverter.

As is customary with alternating current generating circuits, the output of these collector brushes are fed to a WYE-DELTA (3) three phase TRANSFORMER (item 72) via leads (items 66, 67, 68). The voltage level and frequency of the A.C. output to the WYE primary (item 70) of the power transformer is a function of motor (item 33) speed rotation and D.C. source (item 57), voltage level. This was further developed in the description of the type I "PWRI" inverter. This 3 phase system inverter makes this D.C. to A.C. inverter very promising for medium to high power application. Because of the possible rugged construction of the "PWRI", its cost, and reliability, the future of this new device looks very promising. Should my above theory of operation & functioning not be considered totally as stated & not concurred by all, this inventor has no wish to be disagreeable and would not want this invention branded for a lack of explanation or communication syntax.

VIII. SUMMARY, RAMIFICATIONS, SCOPE, AND CONCLUSION

From the previous description of this new Inverter invention and its operating and functioning; This inventor trusts that the PTO will recognize that this unique Electro Mechanical inverter of D.C. to A.C. power is not only fundamentally technologically & mechanically simpler than any other prior art, but also superior in its efficiency, less power limited & particularly more economical.

In addition this new Inverter device can:

1) Also convert A.C. power of one frequency to lower or higher power frequency at higher power level than with present solid state cyclo converter, more economically and without thermal problems and complicated exotic electronic support circuits.

2) Also convert D.C. to Poly phase A.C. for high power application, more economically and simpler than solid state or any other inverter types.

3) Also be used as a source of variable frequency power, for some specific type electric motor speed controls, such as for Electric Vehicles.

4) Can also be used to generate electromechanically, any shape of wave forms for power frequency level & high power by simply changing the pulse width of the copper segments & their spacings.

Added to this multi-application capability, we can add a litany of advantages over state of the art "Inverter" as listed in section III Objective & Advantages see (page 9). The above applications and advantages of this new device will no doubt accrue as its use becomes better known. As mentioned previously the packaging mounting and wiring of the "Sine wave generating drum segment" which is the "heart of this invention" can be varied. For example; this "Sine wave generating drum segment" can be made instead of a drum, as a flat disc with varied conductive & insulated spaces, spinning between collector brushes, or; Rotating collector brushes spinning on the surface of the same but fixed disc. Many other logical arrangements and approaches to do the same thing using this fundamental electro-mechanical principle, are feasible, but will be redundant and re-invention of the same wheel.

It would be desirable that the range of application here in stated, will not be determined only by the specific renditions given, but by the attached claims and their legal extent.

XI. ABBREVIATIONS AND UNITS

Abbreviations Descriptions

A.C.—Alternating Current
A.M.—Ammeter or Amper Meter
&—And
ASSY—Assembly
CA—California
Delta—Transformer Secondary Windings for 3 phase system
DWG—Drawing
EMF—Electromotive Force (Voltage)
EMI—Electromagnetic Interference
FIG.—Figure
Hertz—Unit for frequency
i.e.—id est—that is or for example
IGBT—Insulated Gate Bipolar Transistor
K—Thousand
KV—Kilovolt
KVA—Kilovolt Ampers
L—Lamp, incandescent—electric bulb
MOSFET—Metal Oxide Field Effect Transistor
Ø—Symbol for phase
°—Symbol for degree
PTO—Patent and Trademark Officer
PWM—Pulse Width Modulation
PWRI—Pulse Width Rotary Inverter
Ref—Reference
RFI—Radio Frequency Interference
SCR—Silicon Control Rectifier
SPDT—Single Pole Double Throw Switch
SPST—Single Pole Single Throw Switch
SPWM—Sinusoidal Pulse Width Modulation
V—Volt
Y or WYE—For transformer primary windings for 3 phase system

I claim:

1. A rotary inverter capable of converting a D.C. power source of not less than one Kilowatt to an A.C. output power, by generating a variable pulse train electro-mechanically, and said rotary type inverter comprising a D.C. motor driven Pure Sine Wave generating rotating drum assembly which comprises a solid electrically insulating drum material; upon and around part of this drum is embedded a smooth electrically conductive surface with a specific contour or pattern cut, and this conductive shell is made up of a 360 degree slip ring in the center and two contiguous adjoining parts, each one covering 180 degrees of the said drum, and patterned with segments having each a specific circumferential width and also with each having a specific non-conducting smooth space between each segment; and riding over this said sine wave drum assembly are electrical brush collectors, one brush riding over the central slip ring, brings in the D.C. input source voltage, while the other two brushes, riding over the segmented surfaces, alternately collect and give out the A.C. output power.

2. A rotary inverter, same as in claim 1, but capable of generating polyphase A.C. power output, simply by adding extra sine wave generating drums on the same common D.C. motor driven shaft, and each drum is electrically & mechanically oriented 120 degrees from each other, with extra sets of electrical collector brushes added over each Sine wave generating drum, and so connected that some of the collector brushes bring in the D.C. power input to each said Sine wave generating drum, and the other collector brushes take the output A.C. power to a polyphase electrical load system.

3. A rotary inverter, same as in claim 1, with the added capability of generating a different wave form other than said sine wave; with the essential difference being that on the said sine wave generating drum, the two contiguous electrically conductive and segmented surfaces imbedded thereon, have conductive and insulated segment parameters totally different from that required for a sine wave form, and have specific circumferential widths and spacings required to generate a specific shape.

4. A rotary inverter, same as in claim 1, with the additional capability of generating a variable Sine wave frequency by using the same method of generating variable pulse train electro-mechanically and by a D.C. motor speed control to the D.C. motor driving the Sine wave generating drum.

5. A rotary type inverter, same as in claim 1, with an additional set of brushes riding on an additional conductive polarity reversing segment imbedded into the said Sine wave generating drum insulation, is for application when the A.C. output voltage is single-phase only and need not be greater than the D.C. source voltage load, and takes the place of a center tap transformer D.C. return, or replaces the center tap of a 3 phase Star transformer primary for the D.C. return.

* * * * *